(12) United States Patent
Okude et al.

(10) Patent No.: US 6,708,806 B2
(45) Date of Patent: Mar. 23, 2004

(54) POWER TRANSMISSION APPARATUS

(75) Inventors: Yutaka Okude, Tochigi (JP); Mitsuru Kuroda, Tochigi (JP)

(73) Assignee: Showa Corporation (JP)

( * ) Notice: Subject to any disclaimer, the term of this patent is extended or adjusted under 35 U.S.C. 154(b) by 10 days.

(21) Appl. No.: 10/092,176

(22) Filed: Mar. 6, 2002

(65) Prior Publication Data

US 2003/0019706 A1 Jan. 30, 2003

(30) Foreign Application Priority Data

Jul. 26, 2001 (JP) ........................................ 2001-226712

(51) Int. Cl.$^7$ ................................................ F16D 43/00
(52) U.S. Cl. ...................... 192/35; 192/84.7; 192/84.91
(58) Field of Search ............................. 192/84.7, 84.91, 192/35; 180/233

(56) References Cited

U.S. PATENT DOCUMENTS

| 2,936,053 | A | * | 5/1960 | Reucker ................. 192/84.7 |
| 6,092,633 | A | * | 7/2000 | Morisawa .................... 192/35 |
| 6,109,408 | A | * | 8/2000 | Ikeda et al. ................ 192/35 |
| 6,446,772 | B1 | * | 9/2002 | Inose et al. ................. 192/35 |
| 2002/0134635 | A1 | * | 9/2002 | Teraoka et al. ............. 192/35 |

FOREIGN PATENT DOCUMENTS

| JP | 329562 | 12/1998 |
| JP | 291694 | 10/2000 |

* cited by examiner

Primary Examiner—Rodney H. Bonck
Assistant Examiner—Eric M. Williams
(74) Attorney, Agent, or Firm—Orum & Roth

(57) ABSTRACT

In a power transmission apparatus, comprising: a sub-clutch apparatus, a main clutch apparatus and a cam apparatus, wherein the electromagnet is arranged in an inner diameter side of the main clutch apparatus.

17 Claims, 2 Drawing Sheets

POWER TRANSMISSION APPARATUS

BACKGROUND OF THE INVENTION

1. Field of the Invention

The present invention relates to a power transmission apparatus.

2. Description of the Related Art

In a rear wheel side power transmission system of a four-wheel drive vehicle, such as a power transmission apparatus arranged between an input shaft in a side of a propeller shaft and an output shaft in a side of a rear differential gear which executes a torque transmission from the input shaft to the output shaft, for example, there is a structure described in Japanese Patent Application Laid-Open (JP-A) No. 10-329562.

A conventional power transmission apparatus has a sub-clutch apparatus connected to the input shaft, arranged between an electromagnet and an armature and operating according to a pressing motion applied by the armature attracted due to an excitation of the electromagnet so as to frictionally engage. A main clutch apparatus is arranged between the input shaft and the output shaft and is frictionally engaged by a pressing force, thereby executing a torque transmission between the input shaft and the output shaft. A cam apparatus converts a frictional engagement force of the sub-clutch apparatus into the pressing force for the main clutch apparatus.

In the prior art, the electromagnet is arranged on one side in an axial direction of the sub-clutch apparatus, and the main clutch apparatus is arranged on another side in the axial direction of the sub-clutch apparatus. Accordingly, the electromagnet, the sub-clutch apparatus and the main clutch apparatus are arranged in an axial direction of the power transmission apparatus, whereby the size in an axial direction is unfavorably increased.

SUMMARY OF THE INVENTION

An object of the present invention is to reduce the size in an axial direction of a power transmission apparatus having a sub-clutch apparatus, a main clutch apparatus and an electromagnet.

According to the present invention, there is disclosed a power transmission apparatus having a sub-clutch apparatus, a main clutch apparatus, and a cam apparatus, wherein a torque transmission is executed between an input shaft and an output shaft.

The sub-clutch apparatus is connected to the input shaft. The sub-clutch is arranged between an electromagnet and an armature and operates according to a pressing motion applied by the armature attracted due to an excitation of the electromagnet so as to frictionally engage.

The main clutch apparatus is arranged between the input shaft and the output shaft and frictionally engages due to a pressing force, thereby executing the torque transmission between the input shaft and the output shaft.

The cam apparatus converts a frictional engagement force of the sub-clutch apparatus into the pressing force for the main clutch apparatus.

The electromagnet is arranged in an inner diameter side of the main clutch apparatus.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENTS

Figure 1:
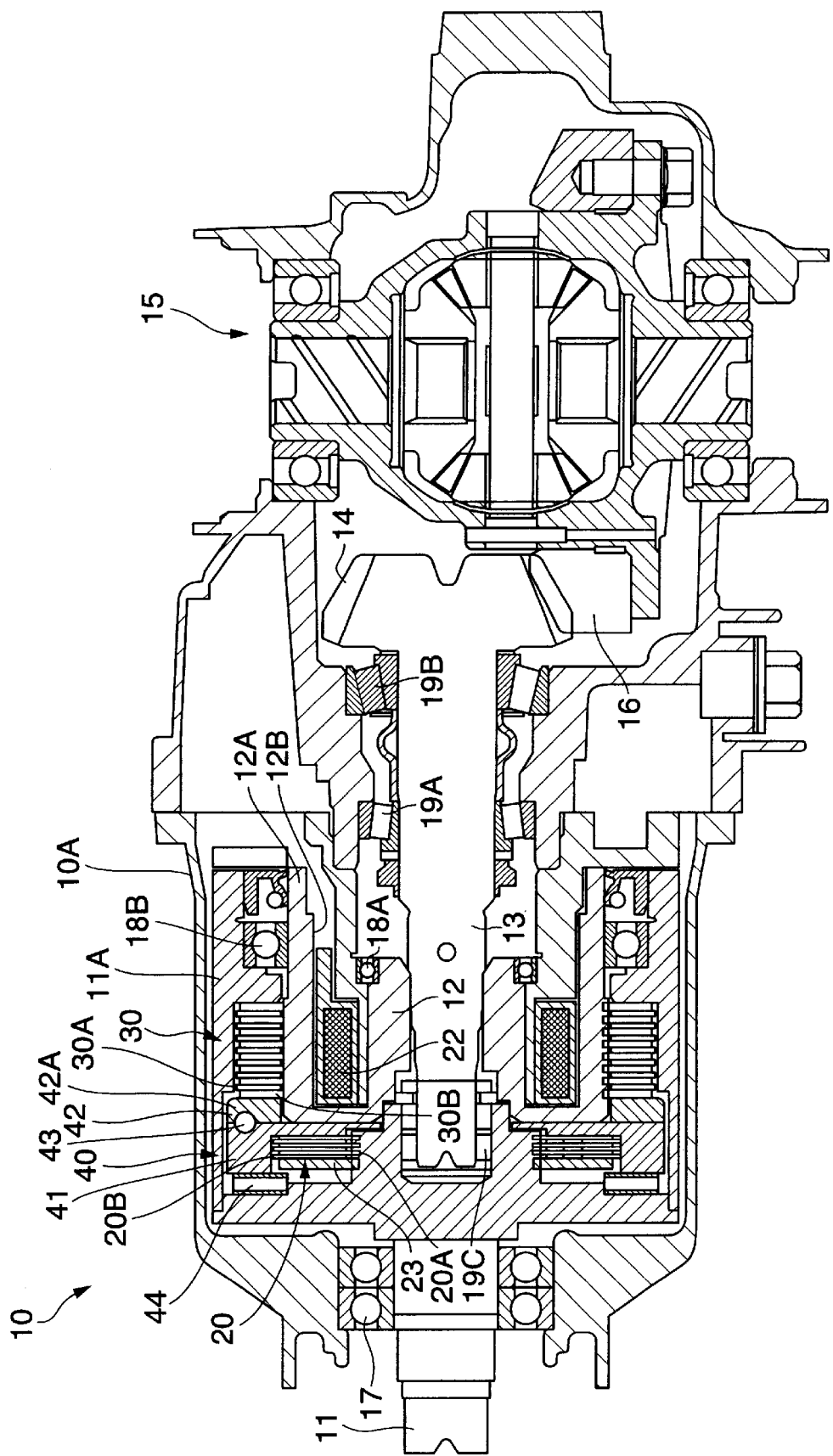
FIG. 1 is a cross sectional view showing a power transmission apparatus.
Figure 2:
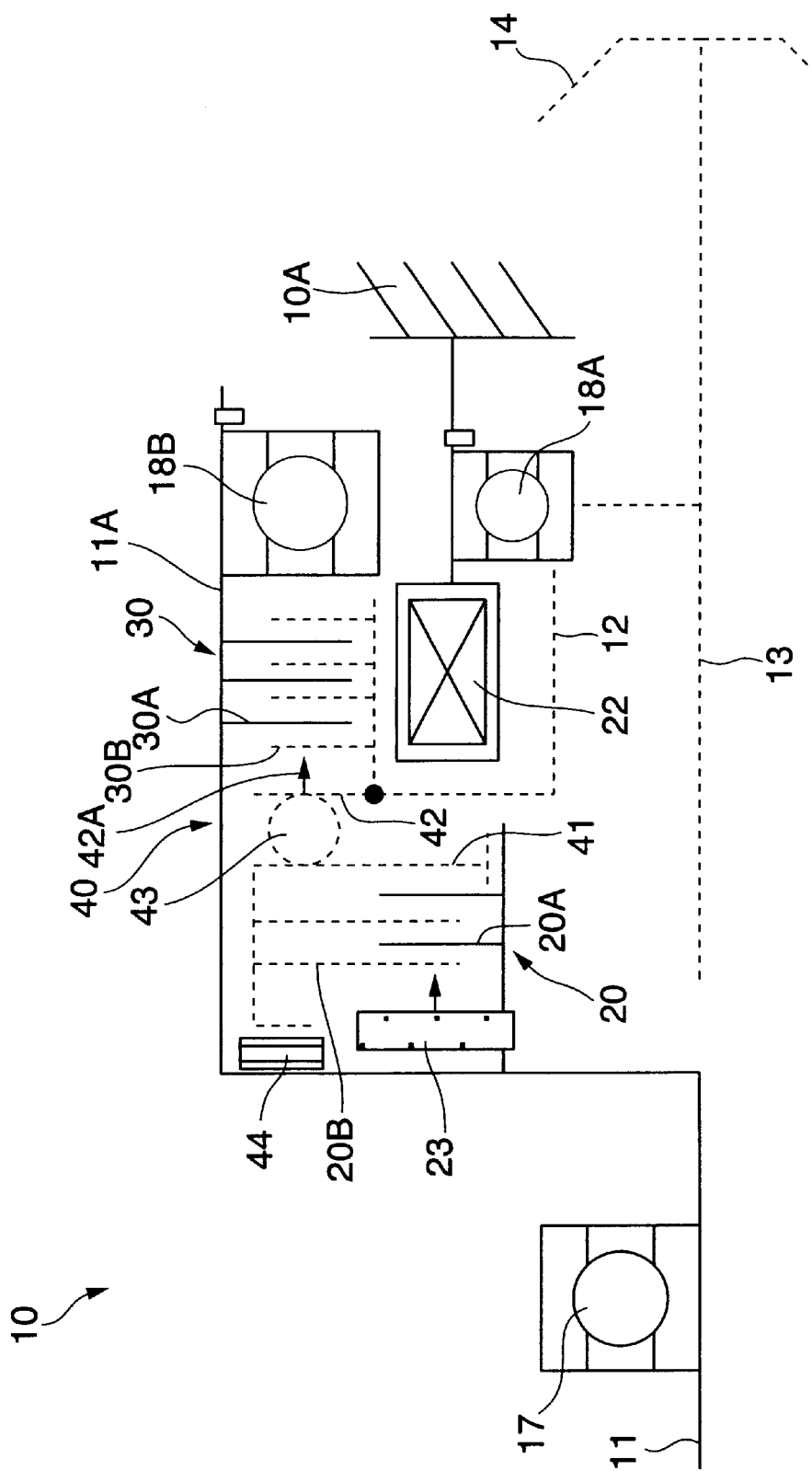
FIG. 2 is a schematic view of FIG. 1.

A power transmission apparatus 10 is arranged in a rear wheel side power transmission system of a four-wheel drive vehicle, and is structured such that an input shaft 11 and an output shaft 12 are coaxially arranged in an inner portion of a differential carrier 10A. A rear end portion of a propeller shaft is connected to the input shaft 11. A drive pinion shaft 13 is spline connected to the output shaft 12, and a drive pinion 14 integrally formed with the drive pinion shaft 13 is engaged with a ring gear 16 of a rear differential gear 15. The power transmission apparatus 10 is structured such as to engage and disengage a torque transmission between the input shaft 11 and the output shaft 12, and when the input shaft 11 and the output shaft 12 are connected to each other, the vehicle operates in a four-wheel drive mode, and the drive force of the engine is distributed to right and left rear wheels via the rear differential gear 15. When the connection between the input shaft 11 and the output shaft 12 is canceled, the rear wheel side power transmission system following after the rear differential gear 15 is disengaged, and the vehicle operates in a two-wheel drive mode driven only by front wheels. In this case, the input shaft 11 is rotatably supported to a differential carrier 10A via a bearing 17, the output shaft 12 is rotatably supported to the differential carrier 10A via a bearing 18A, and is rotatably supported to the input shaft 11 via a bearing 18B. The drive pinion shaft 13 integrally formed with the output shaft 12 is rotatably supported to the differential carrier 10A via bearings 19A and 19B and to the input shaft 11 via a bearing 19C.

The power transmission apparatus 10 has a sub-clutch apparatus 20, a main clutch apparatus 30 and a cam apparatus 40.

(Sub-Clutch Apparatus 20)

The sub-clutch apparatus 20 is connected to the input shaft 11, arranged between an electromagnet 22 and an armature 23, attracts the armature 23 due to an excitation applied by an electric current application of the electromagnet 22 to an electromagnetic coil, and operates according to a pressing motion of the armature 23 so as to frictionally engage.

The sub-clutch apparatus 20 is constituted by a plurality of clutch plates 20A and 20B. The drive side clutch plate 20A is spline connected to an inner periphery of the input shaft 11 so as to be assembled in such a manner as to be capable of moving in an axial direction. The driven side clutch plate 20B is spline connected to an inner periphery of a cam plate 41 of a cam apparatus 40 mentioned later so as to be capable of moving in an axial direction. The drive side clutch plate 20A and the driven side clutch plate 20B are alternately arranged, and are brought into contact with each other so as to be frictionally engaged, thereby moving apart from each other so as to operate in a free state.

The electromagnet 22 is formed in an annular shape and is assembled in the inner portion of differential carrier 10A.

The armature 23 is formed in an annular shape, and is spline connected to an inner periphery of the input shaft 11.

It is assembled in such a manner as to be capable of moving in an axial direction, positioned on an opposite side to the electromagnet 22 and gripping the sub-clutch apparatus 20 therebetween.

(Main Clutch Apparatus 30)

The main clutch apparatus 30 is arranged between the input shaft 11 and the output shaft 12 and is frictionally engaged according to a pressing operation of a pressure plate 42 mentioned above, of a cam apparatus 40. A torque transmission is thereby executed between the input shaft 11 and the output shaft 12.

The main clutch apparatus 30 is constituted by a plurality of clutch plates 30A and 30B. The drive side clutch plate 30A is spline connected to an inner periphery of an outer tube portion 11A of the input shaft 11, assembled in such a manner as to be capable of moving in an axial direction. The driven side clutch plate 30B is spline connected to an outer periphery of the output shaft 12 so as to be capable of moving in an axial direction. The drive side clutch plate 30A and the driven side clutch plate 30B are alternately arranged. They may be brought into contact with each other so as to be frictionally engaged, thereby executing the torque transmission between the inner shaft 11 and the output shaft 12. They are capable of moving apart from each other so as to operate in a free state.

(Cam Apparatus 40)

The cam apparatus 40 converts a frictional engagement force of the sub-clutch apparatus 20 into a pressing force for the main clutch apparatus 30.

The cam apparatus 40 is arranged between the sub-clutch apparatus 20 and the main clutch apparatus 30 in an inner peripheral side of the outer tube portion 11A of the input shaft 11, and has a cam plate 41, a pressure plate 42 and a ball cam 43. The cam plate 41 is spline connected to the outer periphery of the driven side clutch plate 20B of the sub-clutch apparatus 20, and is assembled to be capable of moving in an axial direction. The pressure plate 42 is spline connected to an outer periphery of the outer tube portion 12A of the output shaft 12, and is assembled in such a manner as to be capable of moving in an axial direction. The cam plate 41 and the pressure plate 42 are provided with cam grooves which oppose each other on opposing surfaces thereof, and interpose a ball cam 43 between both of the cam grooves. The cam plate 41 is backed up on an end surface of the input shaft 11 via a thrust bearing 44. The pressure plate 42 can bring a pressing portion 42A into contact with the clutch plate 30A (or 30B) in one end side of the main clutch apparatus 30.

Accordingly, in the power transmission apparatus 10, during assembly of electromagnet 22 in the inner portion of the differential carrier 10A in the manner mentioned above, the electromagnet 22 is arranged so as to be received in an inner diameter side of the main clutch apparatus 30, in other words, within an inner recess portion 12B of an outer tube portion 12A of the output shaft 12 in which a driven side clutch plate 30B of the main clutch apparatus 30 is assembled.

A description will be given below of a power transmitting motion executed by the power transmission apparatus 10.

(1) When the electromagnet 22 is excited, the armature 23 is attracted, the sub-clutch apparatus 20 is frictionally engaged, and in the case that a relative rotational difference is generated between the cam plate 41 and the output shaft 12, a torque of the cam plate 41 is applied to the ball cam 43, and a generated cam thrust force presses the main clutch apparatus 30 via the pressure plate 42 so as to frictionally engage. Accordingly, the input shaft 11 and the output shaft 12 are connected to each other, and the drive force of the engine is transmitted to the rear wheels, whereby the vehicle operates in four-wheel drive mode.

When the sub-clutch apparatus 20 slips according to a control of an exciting electric current of the electromagnet 22, the cam thrust force of the ball cam 43 is changed, and the frictional engaging force of the main clutch apparatus 30 is changed, so that the drive force transmitted to the rear wheels is adjusted. By controlling a drive force distribution ratio between the front wheels and the rear wheels in the manner, for example, it is possible to control steering and stability of the vehicle during turning.

(2) When the excitation of the electromagnet 22 is stopped, the sub-clutch 20 is disengaged, whereby the cam thrust force of the ball cam 43 is canceled, and the main clutch apparatus 30 is also disengaged. The connection between the input shaft 11 and the output shaft 12 is canceled, whereby the vehicle operates in two-wheel drive mode.

According to the present embodiment, the following effects can be obtained.

1) By arranging the electromagnet 22 in the inner diameter side of the main clutch apparatus 30, the electromagnet 22 is received within a range for location which the main clutch apparatus 30 occupies in the axial direction of the power transmission apparatus 10, SO that it is possible to make the size in the axial direction of the power transmission apparatus 10 compact.

2) It is possible to utilize a dead space generated in the inner diameter side of the main clutch apparatus 30 having a comparatively large diameter in the power transmission apparatus 10 as the location space for the electromagnet 22, in order to make the size of the power transmission apparatus 10 compact.

As heretofore explained, embodiments of the present invention have been described in detail with reference to the drawings. However, the specific configurations of the present invention are not limited to the embodiments but those having a modification of the design within the range of the present invention are also included in the present invention. For example, the power transmission apparatus according to the present invention is not limited to the structure for a rear wheel side power transmission system of a four-wheel drive vehicle. This invention can be applied to any structure which is arranged between the input shaft and the output shaft so as to execute a torque transmission.

As set forth above, according to the present invention, the axial size of a power transmission apparatus provided with a sub-clutch apparatus, a main clutch apparatus and an electromagnet can be made compact.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A power transmission apparatus comprising:
   a sub-clutch apparatus connected to an input shaft, arranged between an electromagnet and an armature and operating accordingly to a pressing motion applied by the armature attracted due to an excitation of the electromagnet so as to frictionally engage;

a main clutch apparatus arranged between the input shaft and an output shaft, the main clutch apparatus having a clutch pack being frictionally engageable due to a pressing force, thereby executing a torque transmission between the input shaft and the output shaft; and a cam apparatus having a rolling member wherein the rolling member is disposed at a substantially equal radial distance as the clutch pack with respect to the axis of rotation of the input and output shafts converting a frictional engagement force of the sub-clutch apparatus into the pressing force for the main clutch apparatus, whereby the torque transmission is executed between the input shaft and the output shaft, said main clutch and said cam apparatus are substantially axially arranged;

wherein the electromagnet is arranged in an inner diameter side of the main clutch apparatus.

2. A power transmission apparatus as claimed in claim 1, wherein the armature is formed in an annular shape, and the armature is spline connected to an inner periphery of the input shaft on a side opposite the electromagnet with respect to the sub-clutch apparatus, assembled in such a manner as to be capable of moving in an axial direction.

3. A power transmission apparatus as claimed in claim 1 wherein the input shaft and the output shaft are coaxially arranged in an inner portion of a differential carrier.

4. A power transmission apparatus as claimed in claim 3 wherein the input shaft is rotatably supported to the differential carrier via a first bearing and the output shaft is rotatably supported to the differential carrier via a second bearing.

5. A power transmission apparatus as claimed in claim 3 wherein the output shaft is rotatably supported to the input shaft via a third bearing.

6. A power transmission apparatus comprising:

a sub-clutch apparatus connected to an input shaft, arranged between an electromagnet and an armature and operating accordingly to a pressing motion applied by the armature attracted due to an excitation of the electromagnet so as to frictionally engage;

a main clutch apparatus arranged between the input shaft and an output shaft, the main clutch apparatus having a clutch pack being frictionally engageable due to a pressing force, thereby executing a torque transmission between the input shaft and the output shaft; and a cam apparatus having a rolling member wherein the rolling member is disposed at a substantially equal radial distance as the clutch pack with respect to the axis of rotation of the input and output shafts converting a frictional engagement force of the sub-clutch apparatus into the pressing force for the main clutch apparatus, whereby the torque transmission is executed between the input shaft and the output shaft, the cam apparatus is arranged between the sub-clutch and the main clutch apparatus, wherein the electromagnet is arranged in an inner diameter side of the main clutch apparatus.

7. A power transmission apparatus as claimed in claim 6, wherein the armature is formed in an annular shape, and the armature is spline connected to an inner periphery of the input shaft on a side opposite the electromagnet with respect to the sub-clutch apparatus, assembled in such a manner as to be capable of moving in an axial direction.

8. A power transmission apparatus as claimed in claim 6, wherein the cam apparatus is arranged in an outer tube portion of the input shaft.

9. A power transmission apparatus as claimed in claim 8, wherein the cam apparatus is arranged in an inner peripheral side of the outer tube portion.

10. A power transmission apparatus as claimed in claim 6, wherein the main clutch and the cam apparatus are substantially axially arranged.

11. A power transmission apparatus of claim 10 wherein the sub-clutch, the main clutch, and the cam apparatus are substantially axially arranged.

12. A power transmission apparatus as claimed in claim 6, wherein the input shaft and the output shaft are coaxially arranged in an inner portion of a differential carrier.

13. A power transmission apparatus as claimed in claim 6 wherein the input shaft is rotatably supported to the differential carrier via a first bearing and the output shaft is rotatably supported to the differential carrier via a second bearing.

14. A power transmission apparatus as claimed in claim 6 wherein the output shaft is rotatably supported to the input shaft via a third bearing.

15. A power transmission apparatus comprising:

a sub-clutch apparatus connected to an input shaft, arranged between an electromagnet and an armature and operating accordingly to a pressing motion applied by the armature attracted due to an excitation of the electromagnet so as to frictionally engage;

a main clutch apparatus arranged between the input shaft and an output shaft, the main clutch apparatus having a clutch pack being frictionally engageable due to a pressing force, thereby executing a torque transmission between the input shaft and the output shaft; and a cam apparatus having a rolling member wherein the rolling member is disposed at a substantially equal radial distance as the clutch pack with respect to the axis of rotation of the input and output shafts converting a frictional engagement force of the sub-clutch apparatus into the pressing force for the main clutch apparatus, whereby the torque transmission is executed between the input shaft and the output shaft, the cam apparatus is arranged between the sub-clutch apparatus and the main clutch apparatus;

the input shaft and the output shaft are coaxially arranged in an inner portion of a differential carrier;

the input shaft is rotatably supported to the differential carrier via a first bearing, the output shaft is rotatably supported to the differential carrier via a second bearing; and the output shaft is rotatably supported to the input shaft via a third bearing;

wherein the electromagnet is arranged in an inner diameter side of the main clutch apparatus.

16. A power transmission apparatus as claimed in claim 15, wherein the armature is formed in an annular shape, and the armature is spline connected to an inner periphery of the input shaft on a side opposite the electromagnet with respect to the sub-clutch apparatus, assembled in such a manner as to be capable of moving in an axial direction.

17. A power transmission apparatus as claimed in claim 15, wherein the cam apparatus comprises a cam plate, a pressure plate and a ball;

said cam apparatus is arranged in an inner tube portion of the input shaft;

said cam plate is connected to the sub-clutch apparatus; and said pressure plate is connected to an outer tube portion of the output shaft.

* * * * *